Patented Aug. 3, 1954

2,685,599

UNITED STATES PATENT OFFICE 2,685,599

NEW ALKYLOLAMINE DERIVATIVES AND
PROCESS FOR PREPARING SAME

Joseph B. Dickey, Kingsport, Tenn., and Robert A. Corbitt, Rochester, N. Y., assignors to Eastman Kodak Company, Rochester, N. Y., a corporation of New Jersey No Drawing. Application May 15, 1951,
Serial No. 226,544

4 Claims. (Cl. 260—490)

1

This invention relates to new compounds of the formula:

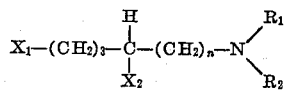

where $X_1$ is selected from halogen, hydroxyl, and —O-acyl, $X_2$ is selected from —O-acyl, —O-aryl, halogenated —O-acyl and hydroxyl, $R_1$ is selected from acyl, alkyl, and hydrogen, $R_2$ is selected from acyl, alkyl, hydrogen and

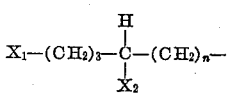

and $n$ is 1–3. The invention also relates to a method of making these compounds from amino derivatives of tetrahydrofuran.

The compounds to which the invention relates fall into two broad subgeneric groups, the first of which is typified by the formula:

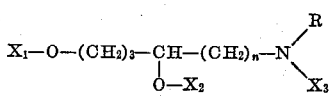

where $n$ is 1–3, $X_1$ and $X_2$ are selected from acyl and hydrogen, $X_3$ is selected from alkyl, acyl, hydrogen and

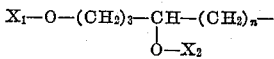

and R is selected from acyl, alkyl, and hydrogen. These compounds are prepared by a novel process comprising reacting an amino derivative of tetrahydrofuran of the formula:

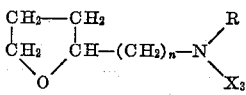

with an organic acid anhydride. This reaction is carried out in the presence of catalysts such as zinc chloride, aluminum bromide, boron trifluoride and the like. Where $X_1$ and $X_2$ are acyl, for example, the compound may be hydrolyzed to the corresponding diol.

The second broad subgeneric group of compounds can be typified by the formula:

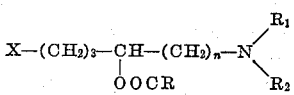

where $n$ is 1–3, X is halogen, R is a group completing an acyl or aryl radical, and $R_1$ and $R_2$ are selected from acyl, alkyl, and hydrogen. These compounds are prepared by the novel proc-

2 ess of reacting an amino derivative of tetrahydrofuran of the formula:

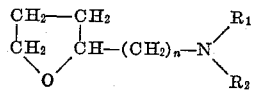

with an organic acid halide in the presence of a catalyst such as zinc chloride, zinc bromide, aluminum chloride, titanium chloride, tin chloride, ferric chloride, boron trifluoride and the like.

The novel process for preparing the generic compound may be described as reacting an amino derivative of tetrahydrofuran of the formula:

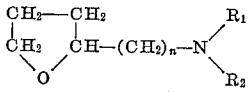

with a compound selected from the group consisting of organic acid anhydrides and organic halides. In the formula just given, the symbols $n$, $R_1$ and $R_2$ have the meanings given above in setting forth the generic compound. The furan ring may include substituent groups such as methyl, ethyl, etc.

It is an object of my invention to provide the novel compounds and processes referred to above.

A further object of the invention is to provide novel compounds of the type referred to above which are useful in the preparation of antimalarials of the atabrine type, the synthesis of dye intermediates, and general organic synthesis. Certain of the compounds, such as the ester amides, are useful for conditioning cellulose ester filaments for knitting, weaving, spinning and the like. The 1-aminopentanediol-2,5 is a valuable intermediate for preparing anthraquinone dyes, for preparing photographic developers such as

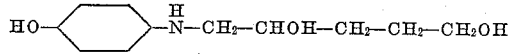

and for removing hydrogen sulfide and other gases from flue gases. Similar uses can be made of the other amines of the invention.

I have found that compounds of the types referred to above can be prepared by the processes which are described generally above. Examples illustrating the carrying out of these processes to manufacture these compounds will now be set forth.

*Example 1.*—143 g. (1.0 mole) N-acetyltetrahydrofurfurylamine, 260 g. acetic anhydride, and 10 g. zinc chloride are heated in a shaking autoclave at 205° C. for 6 hours. When cool, the dark-colored viscous liquid is removed and distilled under reduced pressure. There is obtained a good yield of N-acetyl-1-amino-pentanediol diacetate-2,5 boiling at 205–208° C./2 mm. The product is light-colored viscous oil readily soluble in the common organic solvents. The compound thus prepared has the formula:

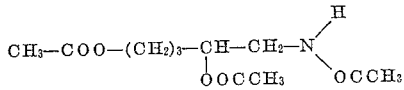

*Example 2.*—This example is carried out exactly as Example 1, except that propionic anhydride is used in place of acetic anhydride. The corresponding N-acetyl-1-pentanediol dipropionate-2,5 boiling at 220–225° C./1.5 mm. is obtained. In an exactly similar manner N-propionyl-1-amino-pentanediol diacetate-2,5, N-propionyl-1-amino-pentanediol dibutyrate-2,5, N-acetyl-1-amino-hexanediol diacetate-3,6, N-acetyl-1-amino-heptanediol diacetate-4,7 have been prepared. Mixed esters can be prepared by using a mixture of anhydrides.

*Example 3.*—1 mole of N-acetylditetrahydrofurfurylamine, 520 g. acetic anhydride, and 15 g. aluminum chloride are reacted at 200° C. for 5 hours. The reaction product is worked up as in Example 1 to give

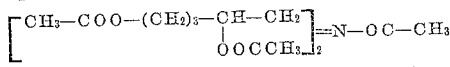

The above reactions can be carried out over a considerable temperature range, with particularly good results being obtained in the 175–225° C. range. The compound prepared in Example 1 above can be hydrolyzed to the corresponding diol as follows:

24.5 g. (0.1 mole) of the compound prepared in Example 1 are placed in 100 cc. ethanol and 15 cc. hydrochloric acid are added. The mixture is warmed on a steam bath for several hours; then the alcohol, water, and acetic acid are removed under reduced pressure. Then 100 cc. anhydrous ethanol are added to the brownish 1-aminopentanediol-2,5 hydrochloride, and the calculated amount of alcoholic sodium hydroxide is added. The salt that separates is filtered off and the alcohol removed. The heavy viscous oil is distilled under reduced pressure and boils at 145–150° C./4 mm. It is a light colored, water-soluble oil which gives a basic test to litmus in water.

This procedure may also be used with the other esters produced by the examples given above, mineral acids or suitable alkalis being useful for this purpose.

The compounds and processes described in the preceding examples fall under the first subgeneric group referred to in the opening portion of this specification. In place of the catalysts set forth in these examples, boron trifluoride and other similar catalysts may be used.

As examples of new compounds and processes for preparing the same falling within the second subgeneric group, the following are given.

*Example 4.*—143 g. (1.0 mole) of N-acetyltetrahydrofurfurylamine, 300 g. of acetyl chloride and 1 g. of zinc chloride are heated under gentle reflux for 15–20 hours. The excess acetyl chloride is removed by distillation and the product is fractionated under reduced pressure to give a good yield of 1-chloro-4-acetoxy-5-N-acetylaminopentane boiling at 210–215°/1.5 mm. The compound thus produced has the formula:

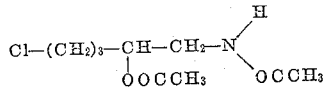

For acetyl chloride there may be substituted acetyl bromide, benzoyl chloride, ethylchloro carbonate, trifluoroacetyl chloride (run under pressure), propionyl chloride, and the like, and the corresponding products prepared.

*Example 5.*—171 g. (1.0 mole) of N-acetyl-N-ethyltetrahydrofurfurylamine and 1 kg. of acetyl bromide are heated under reflux for 20 hours and worked up as above. 1-bromo-4-acetoxy-5-N-acetyl-N-ethylpentane is obtained in good yield and boils at 215–220°/1.5 mm. The compound thus produced has the formula:

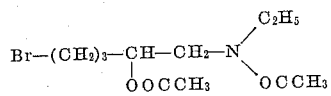

In addition to the acid halides listed above, there may be used furoyl chloride, crotonylbromide, and the like.

*Example 6.*—To prepare 1-chloro-4-acetoxy-7-dimethylaminoheptane; 157 g. (1.0 mole) of 1-dimethylamino-3-tetrahydrofuryl are reacted as in Example 1 with acetyl chloride. A good yield of the desired product is obtained. The compound thus produced has the formula:

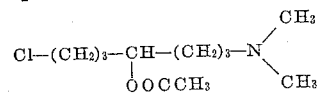

In place of the zinc chloride catalyst used in Examples 4, 5 and 6 above, the following may be used: Zinc bromide, aluminum chloride, titanium chloride, tin chloride, ferric chloride, boron trifluoride, and the like.

It is apparent from the preceding that our invention may be modified in certain respects, as for example, in the employment of a variety of catalysts, pressures, temperatures, and the like. The above examples have been given in an illustrative sense and the scope of the invention is not intended as being limited thereto, except insofar as is necessitated by the prior art and the spirit of the appended claims.

We claim:

1. A new compound having the formula:

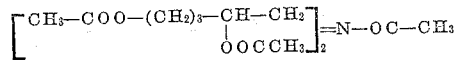

2. A process for preparing a compound having the formula

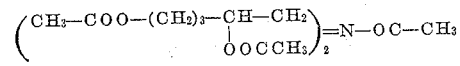

Comprising reacting N-acetylditetrahydrofurfurylamine with acetic anhydride in the presence of aluminum chloride at about 175–225° C.

3. New compounds of the formula

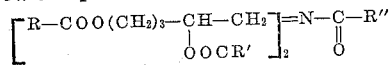

where R, R' and R'' represent lower alkyl.

4. A process for preparing compounds of the formula

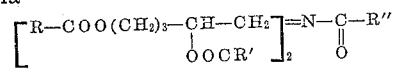

where R, R' and R'' represent lower alkyl, said process comprising reacting an amino derivative of tetrahydrofuran of the formula

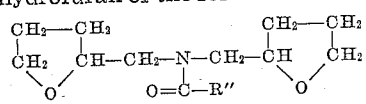

where R, R' and R'' represent lower alkyl, with a lower aliphatic acid anhydride at about 175–

225° C. in the presence of a Friedel-Crafts type metallic halide catalyst.

References Cited in the file of this patent

UNITED STATES PATENTS

| Number | Name | Date |
|---|---|---|
| 2,379,381 | Shelton et al. | June 26, 1945 |
| 2,421,129 | Reasenberg et al. | May 27, 1947 |
| 2,424,184 | Morell | July 15, 1947 |
| 2,472,575 | Dickey | June 7, 1949 |

OTHER REFERENCES

Paul Chem. Abst.(1939), vol. 33, page 4192.

Niemann et al.: "Jour. Org. Chem." (1943), vol. 8, pages 397–404 (Chem. Abst., vol. 38, p. 545).